United States Patent
Dickhaus

(10) Patent No.: US 6,748,342 B1
(45) Date of Patent: Jun. 8, 2004

(54) METHOD AND MONITORING DEVICE FOR MONITORING THE QUALITY OF DATA TRANSMISSION OVER ANALOG LINES

(75) Inventor: Bertold Dickhaus, Düsseldorf (DE)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/959,071

(22) PCT Filed: Mar. 30, 2000

(86) PCT No.: PCT/EP00/02817

§ 371 (c)(1),
(2), (4) Date: Jan. 18, 2002

(87) PCT Pub. No.: WO00/64077

PCT Pub. Date: Oct. 26, 2000

(30) Foreign Application Priority Data

Apr. 20, 1999 (DE) .......................... 199 177 51

(51) Int. Cl.⁷ .............................................. G01N 21/59
(52) U.S. Cl. ........................... 702/188; 702/69; 702/81; 702/84; 702/159; 702/189
(58) Field of Search .................. 702/69, 81, 84, 702/159, 188, 189, FOR 131, FOR 137; 385/14, 15, 27, 28, 31, 32, 39, 47, 50; 398/139–142; 356/73.1; 250/227.21, 227.23, 227.24

(56) References Cited

U.S. PATENT DOCUMENTS

| | | | | |
|---|---|---|---|---|
| 5,077,729 A | * | 12/1991 | Wong | 398/31 |
| 5,090,802 A | * | 2/1992 | Longhurst | 356/73.1 |
| 5,179,275 A | * | 1/1993 | Lieber et al. | 250/227.24 |
| 5,189,300 A | * | 2/1993 | Lieber et al. | 250/227.24 |
| 5,291,326 A | | 3/1994 | Heidemann | 359/160 |
| 5,333,217 A | * | 7/1994 | Kossat | 385/32 |
| 5,349,461 A | * | 9/1994 | Huynh et al. | 398/41 |
| 5,424,831 A | * | 6/1995 | Kossat et al. | 356/73.1 |
| 5,473,423 A | * | 12/1995 | Ruegenberg et al. | 356/73.1 |
| 5,526,175 A | * | 6/1996 | Minelly et al. | 359/337.21 |
| 5,930,435 A | * | 7/1999 | Laming et al. | 385/126 |
| 6,014,481 A | * | 1/2000 | Kremers | 385/24 |
| 6,061,481 A | * | 5/2000 | Heidrich et al. | 385/14 |
| 6,175,449 B1 | * | 1/2001 | Menzel et al. | 359/500 |
| 6,278,815 B1 | * | 8/2001 | Poisel | 385/25 |
| 6,301,404 B1 | * | 10/2001 | Yoneyama | 385/24 |
| 6,377,374 B1 | * | 4/2002 | Davis et al. | 398/82 |
| 6,400,483 B1 | * | 6/2002 | Mueller-Fiedler et al. | 398/194 |
| 6,574,018 B1 | * | 6/2003 | Handelman | 370/280 |
| 6,583,898 B1 | * | 6/2003 | Koeppen et al. | 398/5 |
| 2002/0181914 A1 | * | 12/2002 | Jansen | 385/130 |

FOREIGN PATENT DOCUMENTS

| | | | | |
|---|---|---|---|---|
| EP | 440276 A | * | 8/1991 | G02B/6/28 |
| EP | 0 505 829 A2 | | 9/1992 | H04B/10/08 |
| EP | 0 812 078 A2 | | 12/1997 | H04J/14/02 |
| EP | 0835 005 A2 | | 4/1998 | H04J/14/02 |
| WO | WO 96/07922 | * | 3/1996 | |
| WO | WO 98/44660 | * | 10/1998 | |

* cited by examiner

Primary Examiner—Marc S. Hoff
Assistant Examiner—Carol S Tsai
(74) Attorney, Agent, or Firm—Cohen, Pontani, Lieberman & Pavane

(57) ABSTRACT

The method and respective device monitors the quality of data transmission over wavelength-division-multiplexed channels on an optical waveguide using an analog check signal. The analog check signal is formed by decoupling and combining a fraction p of the signals of each of the wavelengths being monitored at a starting point of a monitoring path, and is then transmitted on an additional wavelength in parallel with the wavelengths being monitored. At a monitoring point on the monitoring path provided for the purpose, a fraction p of the signals on the wavelengths being monitored are decoupled again, as well as at least a fraction of the analog check signal. These decoupled signals are evaluated in order to determine if these has been any change in the intensities of the signals on the wavelengths being monitored between the starting point and the monitoring point.

21 Claims, 2 Drawing Sheets

METHOD AND MONITORING DEVICE FOR MONITORING THE QUALITY OF DATA TRANSMISSION OVER ANALOG LINES

CROSS-REFERENCES TO RELATED APPLICATIONS

This is a U.S. national stage application under 35 U.S.C. §371 of international stage application No. PCT/EP00/02817, filed on Mar. 30, 2000, which, under 35 U.S.C. §363, is also the filing date of this application. Priority is claimed under 35 U.S.C. §119(a) and 35 U.S.C. §365(b) from German Patent Application No. 199 17 751.1, which was filed on Apr. 20, 1999, and from which priority was properly claimed in the aforementioned international stage application No. PCT/EP00/02817.

FIELD OF THE INVENTION

The invention relates generally to a method and system for monitoring the quality of data transmission over analog transmission lines, and, in particular, to a system and method for monitoring the quality of data transmission over an optical carrier, where the data is being transmitted as wavelength-division-multiplexed (WDM) signals.

BACKGROUND OF THE INVENTION

An example of an analog transmission line is an optical fiber cable used in optical telecommunications networks. Using wavelength-division-multiplexing (WDM), it is possible to send different data signals at different wavelengths, i.e., channels, at the same time, on a single optical fiber cable. When building an optical trunk line using wavelength-division-multiplexing (WDM) technology, the signals transmitted on the optical trunk line are considered to be analog signals in order to configure the network as transparently as possible.

Because of the high reliability presently required for data transmission, the ability to determine whether the signals transmitted are adequate or faulty is of great importance.

In the case of digital signals, such as SDH (Synchronous Digital Hierarchy, the CCITT optical carrier standard similar to SONET—Sybnchronous Optical Network) signals, there is the relatively simple option of forming a checksum for each packet or frame of transmitted data, and transmitting this checksum with the packet or frame. At a checkpoint on the receiving end, the checksum is calculated again based on the received packet or frame. The re-calculated checksum, based on the received packet or frame, is compared to the originally formed checksum which was transmitted with the data. In this way, it is possible to make a reliable judgment concerning the quality of the transmission path or the quality of the data signals transmitted.

However, in the case of analog signals it requires considerable expenditure to form a checksum and to add it as redundant information to the actual signal. In addition, for reasonable line monitoring, the optical lines need to be terminated in an optical node where monitoring is to take place. Furthermore, it is necessary that the type of signals being transmitted (e.g. ATM, SDH) be known by the optical network node, which is usually not the case. For these reasons there is no simple way of forming checksums in the case of analog signals.

Because of the problems inherent in forming an optical "analog" checksum, the signal-to-noise ratio is usually used to evaluate optical signals because there is a direct correlation between the bit error rate during transmission and the signal-to-noise ratio.

SUMMARY OF THE INVENTION

It is thus the object of the invention to provide a method and device which offer a simple and reliable way of evaluating the quality of signals transmitted over analog lines.

This object is met by a method according to the present invention for monitoring the quality of data transmission over analog transmission lines, in particular, optical carriers on which the data is being transmitted as WDM signals.

In the inventive method, a fractional portion of the signal on each of the channels, i.e., wavelengths, being monitored is decoupled at the starting point of a monitoring path. An analog check signal is formed from the sum of the intensities of the decoupled signals. This analog check signal is transmitted on an additional channel, i.e., on another wavelength from the wavelengths being monitored. At a monitoring point provided for this purpose, fractional portions of the signals on the wavelengths being monitored are decoupled for a second time and at least a fractional portion of the analog check signal is decoupled as well. The signals decoupled at the monitoring point are evaluated in order to determine if there has been any change of the intensities of the signals on the wavelengths being monitored between the starting point and the monitoring point.

This object of the invention is also met by a monitoring device according to the present invention for monitoring the quality of data transmission over analog transmission lines, in particular, optical carriers such as optical fiber cables, by way of which data is transmitted as WDM signals.

The monitoring device is comprised of a first decoupling device for decoupling fractional portions of the signals on the wavelengths being monitored; a generator for generating an analog check signal from the intensities of the decoupled fractional portions; a coupling device for coupling the generated analog check signal to the optical carrier; a second decoupling device for decoupling fractional portions of the signals on the wavelengths being monitored, as well as at least a fractional portion of the analog check signal from the optical carrier at a monitoring point; and an evaluation unit for evaluating the portions decoupled at the monitoring point to determine if there has been any change in the intensities of the signals on the wavelengths being monitored between the starting point and the monitoring point.

The method according to the invention and the device according to the invention provide a simple and reliable capability for monitoring, on specific transmission paths, the quality of signals transmitted in optical networks.

According to the invention, an analog check signal is tranmitted on a wavelength exclusively provided for this purpose. The analog check signal continuously represents the overall intensity of the signals on the wavelengths being monitored. In this way, the network operator at the end of the monitoring path is provided with information which can be used to determine whether there is a difference between the overall intensity of the wavelengths being monitored at the start of the monitoring path (taking into account the decoupled parts) and the overall intensity of the wavelengths being monitored at the end of the monitoring path. If a change in overall intensity on the monitoring path is detected, the network operator knows that the transmission on one of the monitored wavelengths is not faultless, and suitable measures can be introduced. Introducing such measures can of course also consist of providing an automatic correction device for cases of deviation.

In principle, the method according to the invention and the monitoring device according to the invention can be used on any analog data transmission carriers, but above all telecommunications networks with optical transmission lines are the intended field of application.

According to one advantageous way to generate the analog check signal, the analog check signal is formed such that it is equal to, or proportional to, the sum of the intensities of the fractional portions decoupled at the starting point. By monitoring to what extent the analog check signal transmitted on another wavelength is equal to, or proportional to, a sum formed at the monitoring point of the fractional portions of the signals decoupled at this point of the wavelengths being monitored, information concerning the quality of data transmission on the monitoring path can be assessed. Only if the sum is identical or proportional, can it be assumed that the signals were transmitted without fault on the monitoring path.

According to another advantageous way of generating the analog check signal, the analog check signal is the complement of the sum of the intensities of the fractional portions decoupled at the starting point in respect to a specified value. It is preferable if this specified value equals the sum of the maximum attainable intensity of the signals on the individual wavelengths being monitored. If another value is selected, then this value must exceed the sum of the maximum attainable intensities. In this case, it is only necessary in the evaluation unit to form the sum of all signals decoupled at the monitoring point, including the monitoring signal, and to monitor this sum for constancy.

After the intensity of the signals transmitted on the optical line have been reduced by the double decoupling of fractional portions, it is preferable for said signals to be amplified. This will prevent the intensity of the signals from becoming too low, particularly after passing several monitoring paths.

If there are a large number of wavelengths to be monitored, it is furthermore advantageous if the channels, i.e., wavelengths, are segregated into groups, with an analog check signal being formed for each group, and to transmit the analog check signal on a separate wavelength. When there are wavelength groups, each having its own analog check signal, each group can be associated with a generator of its own and an evaluation unit of its own. In this way, it is possible not only to obtain information concerning the quality of the transmission of all the signals transmitted on the monitoring path, but also concerning the transmission quality in respect to specific wavelengths.

If a relevant deviation is detected between the signal intensities at the starting point of the transmission path and the monitoring point, it is preferable for automatic notification to take place. A notification unit which is connected to the evaluation unit may be provided for issuing such notification.

A particularly compact embodiment of the monitoring device according to the invention is achieved for the use of monitoring the optical carriers of a telecommunications network, in that the decoupling devices and the coupling device, and possibly also the generator of the monitoring signal and the evaluation unit, are integrated into the optical nodes of the network, thus limiting the respective transmission paths.

To generate the analog check signal, the generator requires a certain amount of time. This results in the analog check signal being slightly shifted in time compared to the signals of the wavelengths being monitored. An advantageous embodiment of the monitoring device according to the invention therefore provides delay elements which, for the purpose of compensating for the processing time in the generator, delay the fractional portions of the wavelengths being monitored, at the evaluation unit, before they are used for evaluation. If the delay time is set to the time required by the generator for generating the monitoring signal, then, during evaluation, after the delay, the temporal position of the analog check signal agrees with the fractional portions of the wavelengths being monitored, which are decoupled at the monitoring point. Thus, such delay elements provide a simple way of achieving high precision in evaluation.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

Below, the invention is explained in more detail by means of an exemplary embodiment, with reference to the drawings, in which.

DETAILED DESCRIPTION OF THE PRESENTLY PREFERRED EMBODIMENTS

Figure 1:
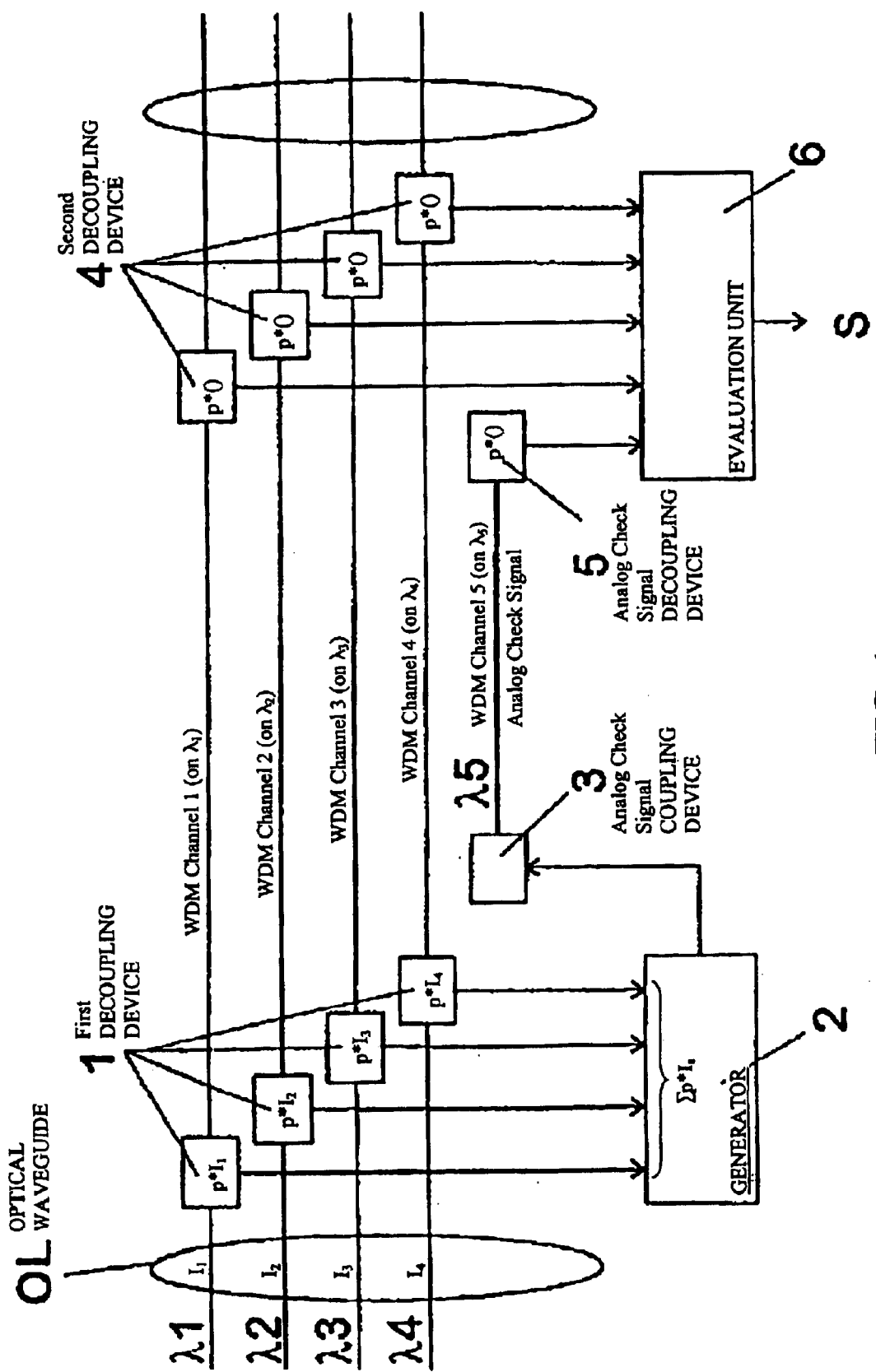
FIG. 1: shows a monitoring path in an optical network comprising an exemplary embodiment of a monitoring device according to an embodiment of the invention.

FIG. 1 shows a section of an optical fiber cable which is being used as an optical waveguide OL. The optical waveguide OL is part of an optical telecommunications network which uses wavelength-division-multiplexing (WDM) for data transmission. In WDM data transmission, different channels are transmitted simultaneously, each channel being carried on a different wavelength. On that part of the optical waveguide OL which is shown, the quality of the signal transmission on wavelengths $\lambda_1$–$\lambda_4$ is being monitored.

In the left area, the optical waveguide OL comprises a first decoupling device. For each of the wavelengths $\lambda_1$–$\lambda_4$ being monitored, the first decoupling device comprises first decoupling means 1 for decoupling a fraction p of the signal on the respective wavelength. The position of this first decoupling device is the starting point of the monitoring path, at the end of which monitoring the quality of the signal transmission is to take place.

The output ports of decoupling means 1 are connected to a generator 2. The generator 2 in turn provides output to a coupling device 3, which is also connected to the optical waveguide OL near the starting point of the monitoring path. Coupling device 3 is for coupling a signal to the optical waveguide OL on a specified wavelength $\lambda_5$.

The end of the monitoring path is defined by a second decoupling device which is comprised of decoupling means 4 for each of the wavelengths $\lambda_1$–$\lambda_4$ being monitored. Similar to first decoupling means 1, the second decoupling means is for decoupling a fraction p of the signal on each respective wavelength being monitored on the optical waveguide OL. The second decoupling device also comprises decoupling means 5 which is for decoupling a fraction p of the signal being transmitted on the channel of wavelength $\lambda_5$.

The output ports of the second decoupling means 4, 5 comprising the second decoupling device are connected to an evaluation device 6. Connection of the evaluation device 6 to further possible elements, such as a display device or a notification device, is not shown.

Below, the function of the described embodiment of a monitoring device according to the invention is described.

By means of the first decoupling device, a fraction p of the signal on each channel, on each of the wavelengths $\lambda_1$–$\lambda_4$ is decoupled. Before the first decoupling, the signals on each of the wavelengths $\lambda_1$–$\lambda_4$ have intensities $I_s$ (with s=1–4).

Figure 2:
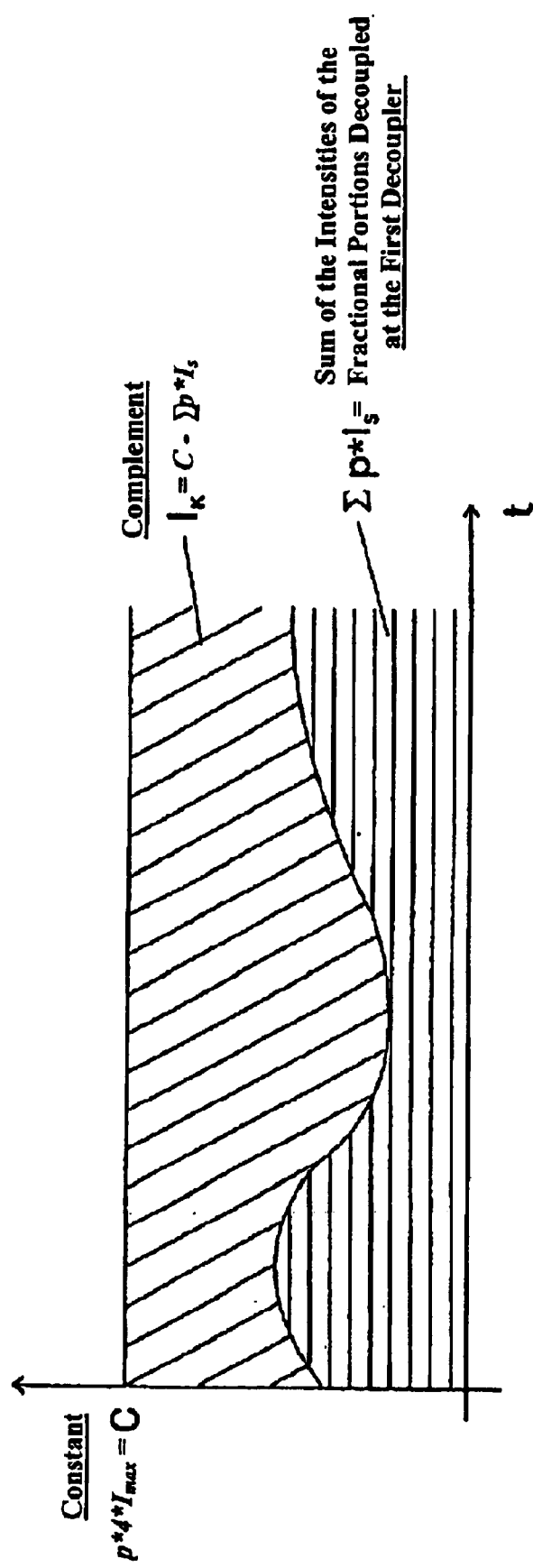
FIG. 2: shows a curve representing an intermediate step of generating a monitoring signal according to an embodiment of the invention.

After the first decoupling, the decoupled fractional portions with intensity $p*I_s$ are supplied to the generator 2. The generator 2 forms the sum $\Sigma p*I_s$ of the intensities of the received decoupled fractional portions. Having obtained this sum, the complement $I_K$ of $\Sigma p*I_s$ in relation to a constant value C is formed, i.e., $I_K=C-\Sigma p*I_s$. The constant C is equal to the product of fraction p, the number of the wavelengths being monitored, and the maximum intensity of the signal on an individual wavelength, $C=p*4*I_{max}$. FIG. 2 shows an exemplary graph over time of a signal of the formed sum $\Sigma p*I_s$ of the intensity of the first decoupled signals as well as the complement $I_K$ formed in relation to it.

When the complement $I_K$ is multiplied by $(1-p)/p$, the resulting value should match the complement of the current signal intensities $(1-p)*I_s$ of the channels on wavelengths $\lambda_1$–$\lambda_4$ being monitored. The current signal intensities on the optical waveguide are $(1-p)*I_s$ due to decoupling at the first decoupling device, where the signals were reduced by the fraction p in comparison to the original signal intensities $I_s$. Subsequently, from the result obtained by multiplication, the generator 2 generates an analog check signal to be transmitted on wavelength $\lambda_5$ which up to this point has not been used for signal transmission, where the analog check signal has an intensity $(1-p)*(4*I_{max}-\Sigma I_s)$, i.e., equivalent to the product obtained by multiplying the complement $I_K$ by $(1-p)/p$. Thus, the analog check signal is a representation of the complement of the sum of the intensities of the transmitted signals. From this representation, if the value C and fraction p with which the signals were first decoupled are known, the sum of intensities of the transmitted signals can clearly be determined. The analog check signal is slightly shifted in time in relation to the monitored signals transmitted on wavelengths $\lambda_1$–$\lambda_4$, because generator 2 requires a certain amount of time to process the received first decoupled signals in order to generate the analog check signal.

The analog check signal is coupled to the optical waveguide OL with wavelength $\lambda_5$ via coupling device 3.

The analog check signal is transmitted in parallel with the data signals being monitored until the end of the monitoring path.

At the monitoring point, a second decoupling of a fraction p of the signals being transmitted on wavelengths $\lambda_1$–$\lambda_4$ is performed via second decoupling means 4 of the second decoupling device. In addition, at this point a fraction p of the analog check signal being transmitted on wavelength $\lambda_5$ is decoupled via the decoupling means 5 of the second decoupling device.

The five decoupled signals are provided to the evaluation unit 6. Next, the four decoupled signals from the wavelengths being monitored are delayed via delay elements contained in the evaluation unit 6 by exactly that time which was required by generator 2 to generate the analog check signal, so that there will be a temporal correspondence between the decoupled fraction of the analog check signal and the four decoupled fractions of the signals being monitored.

After delaying the four decoupled fractions, the evaluation unit 6 adds up the intensities of the four delayed decoupled signals and of the decoupled fractional portion of the analog check signal. In the case of error-free transmission, the resulting sum should be a constant value because the analog check signal represents the complement to the sum of the signals being monitored and because the same fraction p was decoupled at the second decoupling device 4, 5 from all signals. The expected value, i.e., the constant value, of the sum is $p*(1-p)*4*I_{max}$. If there is any deviation from this value, this means that, at least in respect to one of the wavelengths, faulty transmission has occurred on the monitoring path.

Information S which indicates deviation or non-deviation of the sum formed in the evaluation unit from the constant value, is forwarded to a display/notification unit, providing the network operator with an overview of the quality of transmission on the monitoring path. As an alternative or in addition, the information S can also be forwarded for automatic initiation of measures due to faulty transmissions.

Thus, while there have been shown and described and pointed out fundamental novel features of the invention as applied to a presently preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for monitoring the quality of data transmission over an optical waveguide, wherein the data is being transmitted as wavelength-division-multiplexed (WDM) signals, said method comprising the steps of:

decoupling for a first time a fractional portion of the signal on each WDM channel being monitored, said first decoupling being performed at the starting point of a monitoring path;

forming an analog check signal from the intensities of the first decoupled signals;

transmitting the analog check signal on another WDM channel on the optical waveguide;

decoupling for a second time a fractional portion of the signal on each WDM channel being monitored, said second decoupling being performed at a monitoring point of the monitoring path provided for this purpose;

decoupling of at least a fractional portion of the analog check signal, said analog check decoupling being performed at the monitoring point; and evaluating the fractional portions of the signals on the WDM channels being monitored which were decoupled at the monitoring point and the at least a fractional portion of the analog check signal decoupled at the monitoring point in order to determine if there has been any change in the intensities of the signals on the WDM channels being monitored between the starting point and the monitoring point.

2. The method of claim 1, wherein the analog check signal is formed such that it is equal to, or proportional to, the sum of the intensities of the decoupled fractional portions of the signals on the wavelengths being monitored, and wherein the step of evaluation comprises the step of:

monitoring to what extent the analog check signal transmitted on another WDM channel is equal to, or proportional to, a sum formed at the monitoring point, of the intensities of the fractional portions decoupled at the monitoring point from the wavelengths being monitored.

3. The method of claim 1, wherein the analog check signal is formed from the complement of the sum of the intensities of the decoupled fractional portions of the signals on the wavelengths being monitored, and wherein the step of evaluation comprises the step of:

monitoring to what extent the sum of the fractional portions of the WDM channels being monitored and the at least a fractional portion of the analog check signal decoupled at the monitoring point deviates from a constant value.

4. The method of claim 1, further comprising the step of:

amplifying the signals transmitted on the WDM channels being monitored after the step of evaluating in order to compensate for the reduction in intensity caused by the decoupling steps.

5. The method of claim 1, wherein the wavelengths being monitored are divided into groups, with an analog check signal being formed for each group, wherein each said analog check signal is transmitted on a separate wavelength for evaluation at the monitoring point.

6. The method of claim 1, further comprising the step of:

providing a network operator with an overview of the quality of data transmission over the monitoring path based on the step of evaluation.

7. A device for monitoring the quality of data transmission over an optical waveguide, wherein the data is being transmitted as wavelength-division-multiplexed (WDM) signals, comprising:

a first decoupling device for decoupling a fractional portion of the signal on each wavelength being monitored on the optical waveguide;

a generator for generating an analog check signal from the intensities of the fractional portions decoupled by the first decoupling device;

a coupling device for coupling the generated analog check signal to the optical waveguide on another wavelength;

a second decoupling device for decoupling fractional portions of the signals on the wavelengths being monitored, and for decoupling at least a fractional portion of the analog check signal, from the optical waveguide at a monitoring point; and an evaluation unit for evaluating the signal portions decoupled at the monitoring point in order to determine if there has been any change in the intensities of the signals on the WDM channels being monitored between the starting point of the monitoring path and the monitoring point.

8. The monitoring device of claim 7, wherein the first and second decoupling devices and the coupling device are integrated in optical nodes of an optical telecommunications network.

9. The monitoring device of claim 7, wherein the generator of the analog check signal and the evaluation unit are integrated in optical nodes of an optical telecommunications network.

10. The monitoring device of claim 7, wherein the evaluation unit comprises:

delay elements which delay the fractional portions of signals of the wavelengths being monitored, which were decoupled at the monitoring point, before they are used for evaluation in the evaluation unit, in order to compensate for the time spent processing in the generator unit.

11. The monitoring device of claim 7, further comprising:

a notification unit connected to the evaluation unit for issuing information in cases where a relevant deviation of the quality of data transmission is detected by the evaluation unit.

12. The monitoring device of claim 7, wherein the generator is one of a plurality of generators and the evaluation unit is one of a plurality of evaluation units, and wherein each generator and a corresponding evaluation unit is associated with a group of wavelengths.

13. The method of claim 1, wherein the analog check signal represents a sum of the intensities of the signals on the channels being monitored.

14. The method of claim 1, wherein there is a plurality of monitoring points and the last three steps of claim 1 are performed at each monitoring point.

15. The method of claim 1, wherein the optical waveguide is an optical fiber cable.

16. The method of claim 1, wherein the method monitors the quality of data transmission over a plurality of optical waveguides.

17. The method of claim 1, wherein the fractional portion decoupled in the first decoupling comprises a fraction p of the signal on each WDM channel being monitored at the starting point, and wherein the fractional portion decoupled in the second decoupling comprises a fraction p of the signal on each WDM channel being monitored at the monitoring point.

18. The method of claim 1, wherein the step of forming the analog check signal from the intensities of the first decoupled signals comprises the step of:

forming the analog check signal such that it is equal to, or proportional to, the sum of the intensities of the first decoupled fractional portions of the signals on the wavelengths being monitored.

19. The method of claim 1, wherein the step of forming the analog check signal from the intensities of the first decoupled signals comprises the step of:

forming the complement of the sum of the intensities of the first decoupled fractional portions of the signals on the wavelengths being monitored, said complement being:

$$I_{K'} = C - \Sigma p * I_s$$

wherein
C=a constant value equal to, or greater than, the sum of the maximum attainable intensities on the WDM channels being monitored;
p=the fraction of each WDM channel decoupled at the starting point; and
$I_s$=intensity of WDM channel s.

20. The method of claim 19, wherein the step of forming the analog check signal from the intensities of the first decoupled signals further comprises the step of:

forming the analog check signal from the product of multiplying the complement $I_K$ by (1-p)/p.

21. The method of claim 19, wherein the constant value C is comprised such that:

$$C \geq p * n * I_{MAX}$$

wherein
n=the number of WDM channels being monitored;
$I_{MAX}$=the maximum attainable intensity of each WDM channel.

* * * * *